United States Patent
Kajita et al.

(10) Patent No.: US 8,165,391 B2
(45) Date of Patent: Apr. 24, 2012

(54) IMAGE PROCESSING APPARATUS AND IMAGE PROCESSING METHOD TO CORRECT COLOR MISREGISTRATION NEAR A BOUNDARY

(75) Inventors: Yoshiki Kajita, Kawasaki (JP); Takuya Tsujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 12/131,482

(22) Filed: Jun. 2, 2008

(65) Prior Publication Data
US 2008/0304737 A1 Dec. 11, 2008

(30) Foreign Application Priority Data
Jun. 8, 2007 (JP) ................. 2007-153392

(51) Int. Cl.
*G06K 9/34* (2006.01)
(52) U.S. Cl. ........ 382/164; 382/165; 382/167; 382/173; 358/538
(58) Field of Classification Search .................. 382/164, 382/165, 167, 173; 358/538
See application file for complete search history.

(56) References Cited

U.S. PATENT DOCUMENTS

| | | | | |
|---|---|---|---|---|
| 5,852,673 | A * | 12/1998 | Young | 382/164 |
| 6,215,892 | B1 * | 4/2001 | Douglass et al. | 382/128 |
| 6,721,448 | B2 * | 4/2004 | Rao et al. | 382/164 |
| 2002/0102017 | A1 * | 8/2002 | Kim et al. | 382/164 |
| 2003/0152285 | A1 * | 8/2003 | Feldmann et al. | 382/274 |
| 2004/0008886 | A1 * | 1/2004 | Boykov | 382/173 |

FOREIGN PATENT DOCUMENTS
JP 06-296285 10/1994
* cited by examiner

*Primary Examiner* — Matthew Bella
*Assistant Examiner* — Eueng-Nan Yeh
(74) *Attorney, Agent, or Firm* — Cowan, Liebowitz & Latman, P.C.

(57) ABSTRACT

If a pixel of interest on a line of interest is located in an attribute region different from that in which a pixel immediately preceding the pixel of interest is located, the luminance value and color difference values of the pixel of interest are recorded in this order adjacent to data recorded in a data packet set for the line of interest (S811). If the pixel of interest is located in the same attribute region as that in which the preceding pixel is located, the luminance value of the pixel of interest is recorded adjacent to the data recorded in the data packet (S812). The data packet generated by executing the above recording process on each pixel forming the line is output.

9 Claims, 12 Drawing Sheets

Prior Art

IMAGE PROCESSING APPARATUS AND IMAGE PROCESSING METHOD TO CORRECT COLOR MISREGISTRATION NEAR A BOUNDARY

BACKGROUND OF THE INVENTION

1. Field of the Invention

The present invention relates to a technique for compositing a physical space image and a virtual space image.

2. Description of the Related Art

Conventionally, as a method of compressing image information of an image formed by pixels whose pixel values are represented by R (Red), G (Green), and B (blue) values, the following method has been proposed. That is, the method of decreasing an amount of information, that is, compressing the image information, by converting RGB pixel data into a set of luminance data and color difference data, such as YUV pixel data or YCbCr pixel data, and decreasing the spatial resolution of the color difference data is available. More specifically, the image is divided into a plurality of pixel groups. In each pixel group, the luminance values of pixels within the pixel group are saved without any change and only representative values of color difference values within the pixel group are saved, thereby decreasing the spatial resolution of the color difference data. Since this method is based on the characteristics of the human eye that is sensitive to a change in brightness but is insensitive to a change in color, a person who is looking at the image does not easily perceive deterioration of the image quality. Therefore, the method has been widely used as an efficient compression method.

In such compression method using color space conversion, however, color misregistration readily occurs near boundaries within an image.

FIG. 2 is a view for explaining color misregistration due to image information compression using color space conversion.

Referring to FIG. 2, reference numeral 201 denotes an image including a spherical object region 201a and a background region 201b. Each pixel of the image 201 has a pixel value in an RGB color space. Reference numerals 202 and 203 denote regions in a boundary portion between the regions 201a and 201b.

The middle part of FIG. 2 shows the enlarged regions 202 and 203. Each of the regions 202 and 203 includes a plurality of pixels. The image is managed every 1×4 pixels (pixel group) as indicated by solid lines. As described above, in order to decrease image information, the pixel value of each pixel of the image 201 is converted into a set of a luminance value and color difference values, and the color difference values of the pixels of a pixel group are made equal to the color difference values of a pixel at the start position of the pixel group.

The lower part of FIG. 2 shows pixels within the regions 202 and 203 when the pixel values of the pixels within the regions 202 and 203 for which the image information has been decreased as described above are converted into pixel values in the RGB color space. When the image information for the regions 202 and 203 decreases as described above, the color difference values of the pixels at a position next to the start position and subsequent positions within the pixel group are different from the original color difference values, as indicated by pixels 206. If such pixel values of the pixels are converted into those in the RGB color space, the RGB values of the pixels at the position next to the start position and subsequent positions within the pixel group may be considerably different from the original RGB values. If the pixels 206 are located in the boundary portion between the regions 202 and 203, color misregistration occurs near the boundary.

A technique of correcting color misregistration of pixels near a boundary, and reducing deterioration of image quality has already been disclosed (Japanese Patent Laid-Open No. 6-296285). According to the technique, the luminance values and color difference values of pixels arranged along the horizontal, main scan direction are stored in an image memory. The start and end points of an edge at which an amount of change of the luminance value is equal to or larger than a predetermined value are detected. The color difference values of a pixel preceding to the start point of the edge and those of a pixel subsequent to the end point of the edge are corrected by using the color difference values in the image memory.

However, the above-described conventional method has the following problems.

In a method of detecting an edge using the magnitude of an amount of change of luminance value, even if the difference in color looks large, when the luminance values of pixels near the boundary are almost same, it is impossible to detect an edge. As a result, color misregistration in the boundary portion becomes significant. This will be an obstacle especially when faithful background segmentation such as chroma key composition is required. That is, an unnatural image or an image with image quality deterioration is generated.

SUMMARY OF THE INVENTION

The present invention has been made in consideration of the above problems, and has as its object to provide a technique for resolving color misregistration which occurs between different regions when a process of decreasing image information of an image is executed.

According to the first aspect of the present invention, there is provided an image processing apparatus comprising an input unit adapted to input an image formed by attribute regions which are a non-background region and a background region including pixels each having a preset luminance value and color difference value a read unit adapted to sequentially read a luminance value and color difference value of each pixel forming the image a determination unit adapted to determine, based on a luminance value and color difference value of a pixel of interest read by the read unit, whether the pixel of interest belongs to the background region or the non-background region a recording unit adapted to record the luminance value and color difference value of the pixel of interest as data of a group different from that to which a preceding pixel read by the read unit immediately before the pixel of interest belongs if an attribute region to which the pixel of interest belongs is different from that to which the preceding pixel belongs, and record the luminance value of the pixel of interest adjacent to data already recorded in the group to which the preceding pixel belongs if the attribute region to which the pixel of interest belongs is the same as that to which the preceding pixel belongs and an output unit adapted to output the data recorded by the recording unit.

According to the second aspect of the present invention, there is provided an image processing method comprising an input step of inputting an image formed by attribute regions which are a non-background region and a background region including pixels each having a preset luminance value and color difference value a read step of sequentially reading a luminance value and color difference value of each pixel forming the image a determination step of determining, based on a luminance value and color difference value of a pixel of interest read in the read step, whether the pixel of interest belongs to the background region or the non-background region a recording step of recording the luminance value and color difference value of the pixel of interest as data of a group different from that to which a preceding pixel read in the read step immediately before the pixel of interest belongs if an attribute region to which the pixel of interest belongs is different from that to which the preceding pixel belongs, and recording the luminance value of the pixel of interest adjacent to data already recorded in the group to which the preceding pixel belongs if the attribute region to which the pixel of interest belongs is the same as that to which the preceding pixel belongs and an output step of outputting the data recorded in the recording step.

According to the third aspect of the present invention, an image processing apparatus comprising an image acquisition unit adapted to acquire an image formed by a plurality of pixels an acquisition unit adapted to acquire information on a region within the image a first management unit adapted to manage a plurality of pixels adjacent to each other within the image as pixels having the same color and a second management unit adapted to execute management different from that in the first management unit on a plurality of pixels, of the plurality of pixels, which are adjacent to a boundary between the regions within the image and which belong to different regions.

According to the fourth aspect of the present invention, there is provided an image processing method comprising an image acquisition step of acquiring an image formed by a plurality of pixels an acquisition step of acquiring information on a region within the image a first management step of managing a plurality of pixels adjacent to each other within the image as pixels having the same color and a second management step of executing management different from that in the first management step on a plurality of pixels, of the plurality of pixels, which are adjacent to a boundary between the regions within the image and which belong to different regions.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that these embodiments will be described as examples of preferred arrangements of the invention described in the scope of claims, and the invention is not limited to the embodiments to be described hereinafter.

First Embodiment

Figure 3:
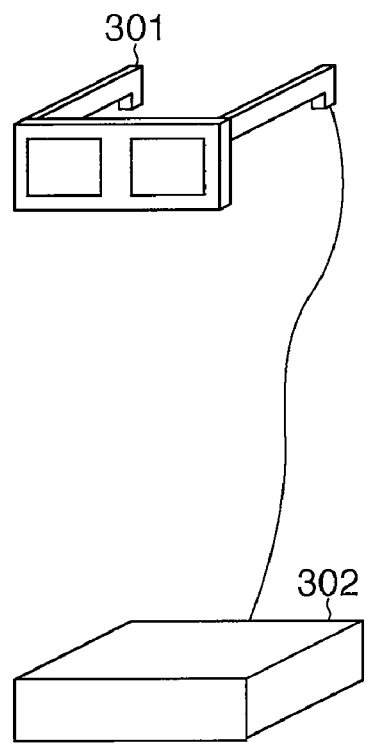
FIG. 3 is a view showing an arrangement example of a system according to the first embodiment of the present invention.

FIG. 3 is a view showing an arrangement example of a system according to this embodiment. As shown in FIG. 3, the system according to this embodiment comprises an HMD (Head Mounted Display) 301 and a controller 302. The HMD 301 and the controller 302 are connected to be able to communicate data with each other. They may be connected either via a cable or wirelessly.

The HMD 301 will be described first. As is well known, the HMD 301 is worn by an observer on the head, and presents an image in front of the observer's eyes. In this embodiment, the HMD 301 displays an image sent from the controller 302 in front of the eyes of the observer wearing the HMD 301 on the head. The HMD 301 may operate by supplying power from the controller 302 or by supplying power from the battery of the HMD 301 itself. A handheld display device such as binoculars may be used in place of the HMD 301, and the present invention is not limited to the head mounted display.

The controller 302 will be described next. The controller 302 generates an image to be sent to the HMD 301, and transmits the generated image to the HMD 301. The controller 302 executes, on the image, various image processes such as image resolution conversion, color space conversion, and optical system distortion correction, transmission format conversion, and the like. A further detailed explanation will be given hereinafter.

In the arrangement according to this embodiment, the HMD 301 obtains position and orientation information of the observer's viewpoint, and transfers the information to the controller 302. The controller 302 generates a virtual space image using the position and orientation information, decreases (compresses) the amount of information of the generated virtual space image, and sends the result to the HMD 301. The HMD 301 executes chroma key composition of the virtual space image decoded based on the result and a physical space image sensed by an image sensing device (to be described later) of the HMD 301 to generate a composite image, and displays the generated composite image on a display unit of the HMD 301.

Figure 4:
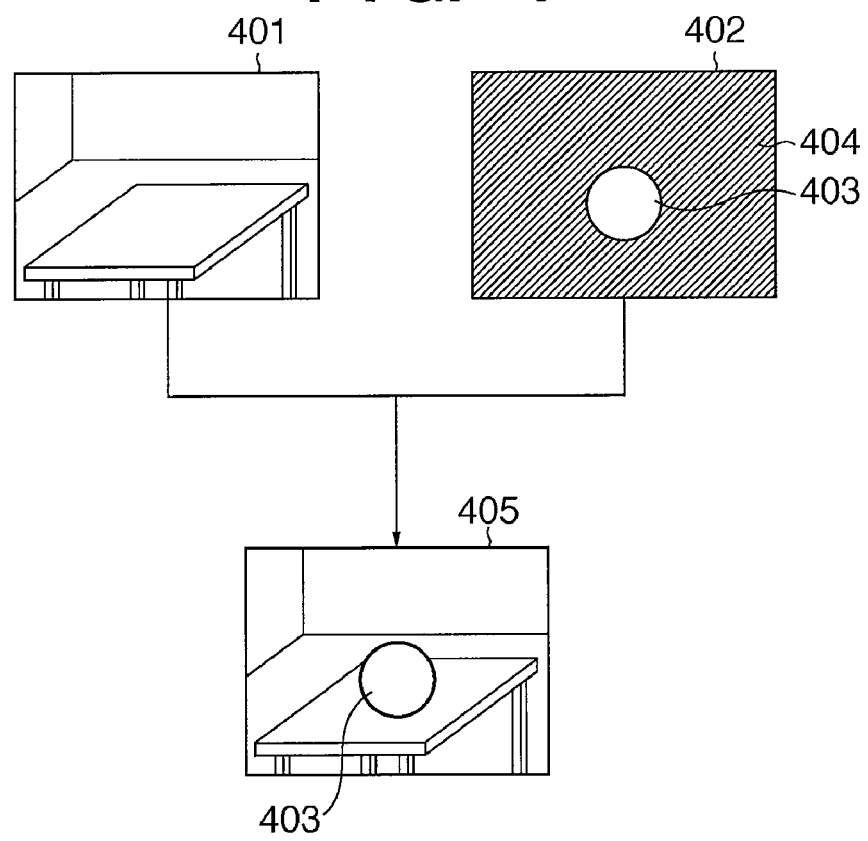
FIG. 4 is a view for explaining chroma key composition.

FIG. 4 is a view for explaining the chroma key composition. Referring to FIG. 4, reference numeral 401 denotes a physical space image obtained by sensing a physical space. Reference numeral 402 denotes a virtual space image of a virtual space, where a virtual object (object) is placed, seen from an arbitrary viewpoint. The virtual space image 402 includes two attribute regions, that is, a region 403 (an object region) where the virtual object is rendered and a background region 404. Pixels having a preset chroma key color form the background region 404.

The controller 302 generates a virtual space image 402, and sends it to the HMD 301. The HMD 301 executes the chroma key composition of the physical space image 401 sensed by the image sensing device (to be described later) of the HMD 301 and the virtual space image 402 received from the controller 302. As a result, a composite image 405 is generated. In the chroma key composition, pixel values on the virtual space image 402 are referred to, and pixels having a pixel value representing the chroma key color are substituted for corresponding pixels on the physical space image 401. This makes it possible to generate a composite image 405 in which the background region 404 on the virtual space image 402 has been substituted for a corresponding region on the physical space image 401.

Figure 1:
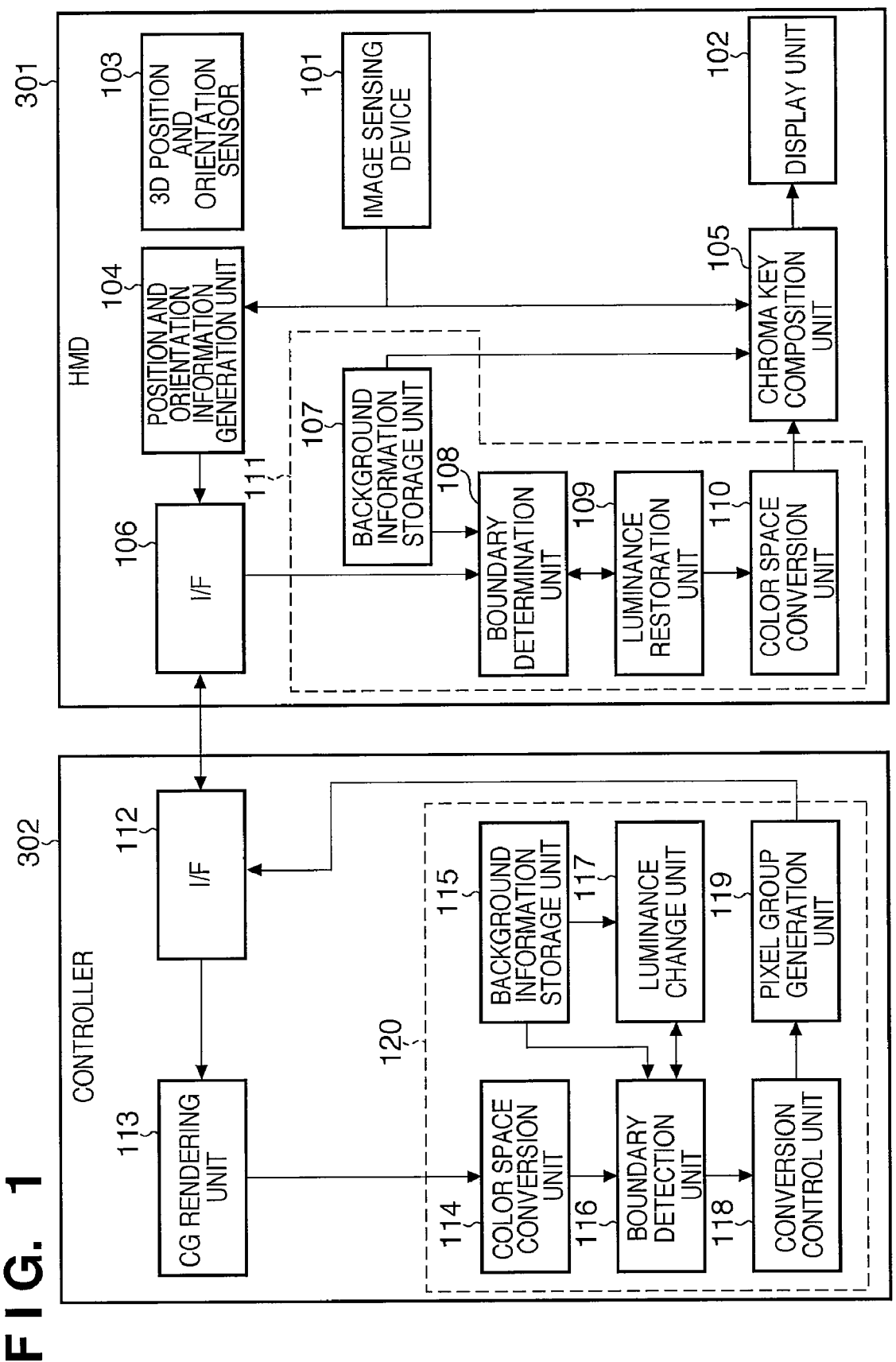
FIG. 1 is a block diagram showing a functional arrangement example of a system shown in FIG. 3.
Figure 2:
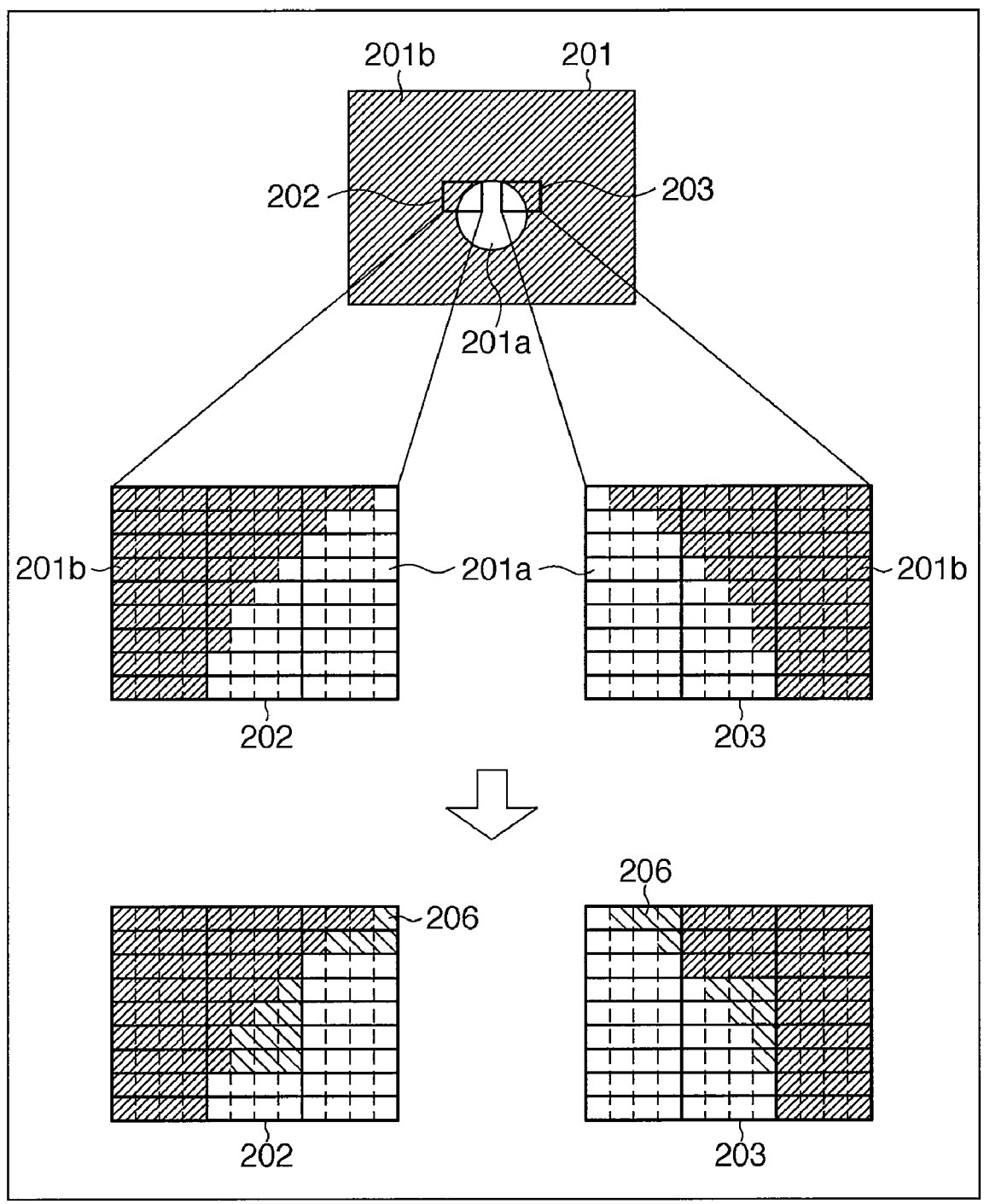
FIG. 2 is a view for explaining color misregistration due to image information compression using color space conversion.

FIG. 1 is a block diagram showing a functional arrangement example of the system shown in FIG. 3. As described above, the system according to this embodiment comprises the HMD 301 and the controller 302, which are connected either via a cable or wirelessly to be able to communicate data with each other.

The HMD 301 will be described first.

A three-dimensional (3D) position and orientation sensor 103 measures the position and orientation of itself, and sends the measurement result as position and orientation information to a subsequent position and orientation information generation unit 104. As the 3D position and orientation sensor 103, various sensors such as a magnetic sensor, optical sensor, and ultrasonic sensor are applicable.

An image sensing device 101 is attached to the HMD 301 so as to be located near the eyes of the observer wearing the HMD 301 on the head, and senses a moving image of the physical space which is seen from the position of the device 101 in accordance with its orientation. The device 101 sends the sensed frame images (physical space images) to the position and orientation information generation unit 104 and a chroma key composition unit 105.

A display unit 102 displays the images sent from the chroma key composition unit 105. The display unit 102 is attached to the HMD 301 so as to be located in front of the eyes of the observer wearing the HMD 301 on the head. The images sent from the chroma key composition unit 105 are, therefore, displayed in front of the eyes of the observer wearing the HMD 301.

The position and orientation information generation unit 104 calculates the position and orientation of the image sensing device 101 using the physical space images received from the image sensing device 101 and the position and orientation information sent from the 3D position and orientation sensor 103. A process executed by the position and orientation information generation unit 104 is a well-known technique, and a description thereof will be omitted. A process for calculating the position and orientation of the image sensing device 101 by the position and orientation information generation unit 104 is not limited to this, and various methods are available. For example, the unit 104 may calculate the position and orientation of the image sensing device 101 by adding the position and orientation relationship between the image sensing device 101 and the 3D position and orientation sensor 103, which has been measured in advance, to the position and orientation information sent from the 3D position and orientation sensor 103, or by using, as an index, an object within the physical space image sent from the image sensing device 101. The position and orientation information generation unit 104 may be provided in the controller 302 instead of the HMD 301. In this case, the HMD 301 sends only the position and orientation information as the result of the measurement by the 3D position and orientation sensor 103 to the controller 302. The position and orientation information generation unit 104 of the controller 302 executes the above-described process using the position and orientation information to calculate the position and orientation of the image sensing device 101.

In either case, the position and orientation information generation unit 104 sends position and orientation information representing the calculated position and orientation of the image sensing device 101 to a subsequent I/F (interface) 106.

The I/F 106 sends the position and orientation information to the controller 302. Upon reception of image information (a data packet) (to be described later) sent from the controller 302, the I/F 106 sends the image information to a boundary determination unit 108 of a decoding device 111. Components of the decoding device 111 will be described later. The controller 302 will now be explained.

Upon reception of the position and orientation information sent from the I/F 106, an I/F 112 sends (outputs) the received information to a subsequent CG (Computer Graphics) rendering unit 113. The I/F 112 sends the image information generated with a process (to be described later) by the controller 302 to the HMD 301.

The CG rendering unit 113 forms a virtual space based on the data of the virtual space held by itself. The unit 113 generates, as a virtual space image, an image of the formed virtual space which is seen from the viewpoint having the position and orientation represented by the position and orientation information received from the I/F 112. The virtual space image includes two attribute regions, that is, an object region (non-background region) where a virtual object is rendered and a background region having a preset chroma key color. The unit 113 sends the generated virtual space image to a subsequent color space conversion unit 114 of a conversion device 120.

When the pixel value of each pixel of the virtual space image received from the CG rendering unit 113 represents an RGB value, the color space conversion unit 114 converts the pixel value into that representing a set of a luminance component and color difference components. That is, the unit 114 converts color components represented by the pixel value of each pixel of the virtual space image into a luminance component and color difference components. For example, the unit 114 converts the pixel value of each pixel of the virtual space image into that represented by a set of a luminance component and color difference components such as YUV or YCbCr. The unit 114 then sends the converted virtual space image to a subsequent boundary detection unit 116. If the pixel value of each pixel of the virtual space image received from the CG rendering unit 113 represents a luminance value and color difference values, the color space conversion unit 114 sends the virtual space image to the subsequent boundary detection unit 116 without executing any process on the virtual space image.

A background information storage unit 115 stores data representing a luminance value and color difference values of the chroma key color. The same data as that held in the background information storage unit 115 are also held in a background information storage unit 107 (to be described later) of the HMD 301. Furthermore, the background information storage unit 107 stores RGB value data representing the chroma key color.

Upon reception of the virtual space image which has undergone the color space conversion from the color space conversion unit 114, the boundary detection unit 116 sequentially reads (refers to), for each line of the virtual space image, the luminance values and color difference values of pixels of the line. Each line is read from one side to the other side. It is determined whether the read luminance value and color difference values are equal to those held in the background information storage unit 115. The term "equal" in this embodiment should be construed as "within a preset range" instead of "completely equal to a value". If it is determined that the luminance value and color difference values of the pixel are equal to those held in the background information storage unit 115 respectively, the pixel is determined to be located within the background region; otherwise, the pixel is determined to be located within the object region.

A luminance change unit 117 compares the magnitude of a luminance value x of the pixel which has been determined to be located within the object region by the boundary detection unit 116 with the magnitude of a luminance value y held in the background information storage unit 115. If $x \geq y$, the luminance value x is incremented. The increment is not especially limited. In this embodiment, assume that the increment is "+1". Note that the luminance value control process is executed so that a pixel of the background region does not have the same luminance value as that of a pixel of the object region. When such pixel does not exist, the luminance value control process need not be executed.

A conversion control unit 118 sets start pixel positions (to be described later) at a plurality of positions in a line with processes to be explained later.

A pixel group generation unit 119 specifies pixels, which are located within the same attribute region as that of a set start pixel position, are arranged at successive pixel positions subsequent to the start pixel position in a pixel array having a predetermined length (=L) from the start pixel position. The unit 119 determines a pixel group formed by the pixel at the start pixel position and the specified pixels. The unit 119 records, adjacent to the already recorded data, the luminance value and color difference values (in this order) of the pixel at the start pixel position and the luminance values of the specified pixels in a data packet set for each line. The data packet undergoes the above recording process for the start pixel positions set at the plurality of positions in the line. This makes it possible to complete "the data packet for the line". The unit 119 sends "the data packet for the line" to the I/F 112. The I/F 112 sends the data packet as image information to the HMD 301. The transmission method is not limited to the packet transmission, and an arrangement in which image information processed for each pixel is streamed without packetizing may be used.

Upon reception of the data packet, the I/F 106 sends it to the boundary determination unit 108 of the decoding device 111.

The boundary determination unit 108 decodes the virtual space image on the basis of the received data packet. More specifically, assume that the unit 108 receives the data packet for a line of interest. The unit 108 reads, as a reading value, the luminance value or the color difference values recorded in the data packet from the top. Two types of data, that is, the luminance value and color difference value, are recorded in the data packet as described above. The luminance value is always read at first. When the luminance value is read as a reading value, it is determined whether the read luminance value is equal to the luminance value stored in the background information storage unit 107. As a result, if they are equal to each other, a pixel having the read luminance value can be determined to be located within the background region; otherwise, a pixel having the read luminance value can be determined to be located within the object region.

When the attribute region to which the pixel (pixel of interest) having the read luminance value (luminance value of interest) belongs is different from that to which the pixel having a luminance value read immediately before the luminance value of interest belongs, subsequent color difference values corresponding to the luminance value of interest are read. The read color difference values are set as a setting value to be used for restoring a pixel together with luminance values to be read after the color difference values. A pixel is restored based on the luminance value of interest and the color difference values.

On the other hand, when the attribute region to which a pixel of interest having the read luminance value of interest belongs is the same as that to which the pixel having the luminance value read immediately before the luminance value of interest belongs, a pixel is restored based on the luminance value of interest and the color difference values set as the setting value. It is possible to decode the virtual space image for one line by executing the above-described process on the data packet. The virtual space image for a plurality of lines can be decoded by executing such decoding process every time a data packet is received.

A luminance restoration unit 109 returns, by the change made by the luminance change unit 117, the luminance value of the pixel, of the pixels forming the virtual space image, which has been determined to be located within the object region. For example, if the luminance change unit 117 has incremented the luminance value by "+1", the luminance restoration unit 109 subtracts "+1" from the luminance value. The virtual space image restored by the luminance restoration unit 109 is sent to a subsequent color space conversion unit 110.

The color space conversion unit 110 executes the inverse conversion process of the conversion process performed by the color space conversion unit 114 to convert the color space of the pixel values of the pixels within the virtual space image received from the luminance restoration unit 109 into the RGB color space. The virtual space image within which the color space of the pixels has been converted into the RGB color space by the color space conversion unit 110 is sent to the subsequent chroma key composition unit 105.

The chroma key composition unit 105 executes the chroma key composition of the virtual space image received from the color space conversion unit 110 and the physical space image received from the image sensing device 101. More specifically, if the pixel value of each pixel forming the virtual space image is referred to, and is equal to the RGB value of the chroma key color stored in the background information storage unit 107, the unit 105 updates the pixel value of the pixel with the pixel value of a pixel at a corresponding position on the physical space image. If the pixel value is not equal to the RGB value, no process is executed.

Processes of generating a data packet which are executed by the conversion control unit 118 and the pixel group generation unit 119 will be described next with reference to FIGS. 5 and 6.

Figure 5:
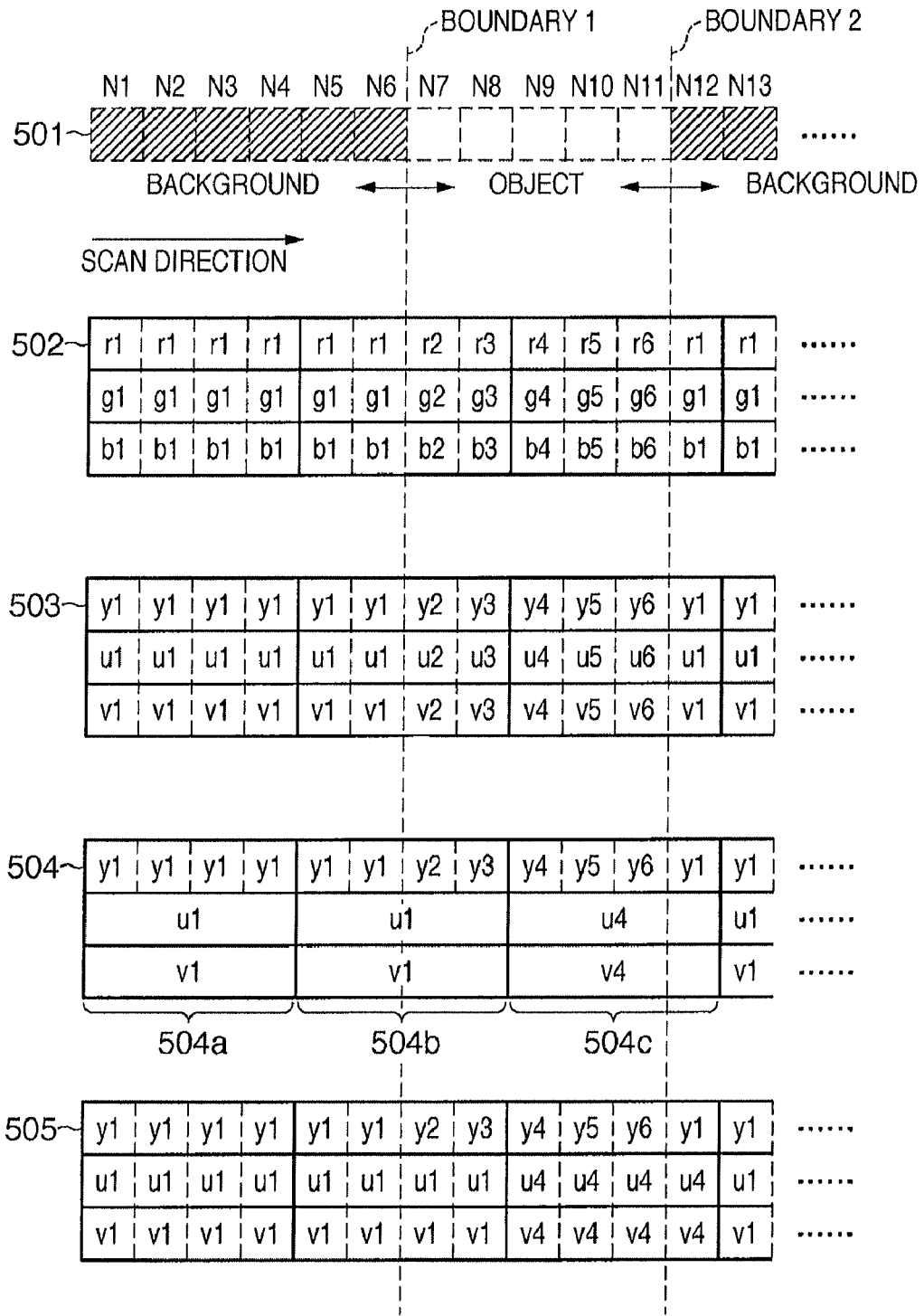
FIG. 5 is a view for explaining a conventional technique of equalizing color difference values for each pixel array having a predetermined length in order to decrease the amount of information on an image.

FIG. 5 is a view for explaining a conventional technique of equalizing color difference values for each pixel array having the predetermined length in order to decrease the amount of information on the image.

Referring to FIG. 5, reference numeral 501 denotes a pixel array including pixels N1 to N13. In this case, the pixels N1 to N6, N12, and N13 are located within the background region. The pixels N7 to N11 are located within the object region. As indicated by an arrow in FIG. 5, assume that a direction from the pixel N1 to the pixel N13 is a scan direction when processing or transmission is executed.

Reference numeral 502 denotes the RGB values of the pixels N1 to N13. For example, the R, G, and B values of the pixel N4 are r1, g1, and b1, respectively. The R, G, and B values of the pixel N8 are r3, g3, and b3, respectively.

Reference numeral 503 denotes the pixel values of the pixels N1 to N13 when the color space (RGB color space) of the pixels N1 to N13 is converted into the YUV color space.

In this case, the pixels N1 to N13 are divided into groups each including four pixels. In each pixel group (surrounded by thick solid lines), color difference values are made equal, thereby decreasing the amount of information of the whole image. Assume that the color difference values of a pixel at the start pixel position within a pixel group are defined as representative color difference values of the pixel group, and the color difference values of the pixels within the pixel group are made equal to the representative color difference values.

Reference numeral 504 denotes the pixel values of the pixels N1 to N13 when the color difference values are made equal to the representative color difference values for each pixel group. As indicated by the pixel values 504, color difference values u1 and v1 at the start pixel position of a first pixel group 504a are set to those of each pixel within the pixel group 504a. The color difference values u1 and v1 at the start pixel position of a second pixel group 504b are set to those of each pixel within the pixel group 504b. Color difference values u4 and v4 at the start pixel position of a third pixel group 504c are set to those of each pixel within the pixel group 504c.

Reference numeral 505 denotes the YUV pixel values of the pixels before the pixel values 504 of the pixels undergoes the color space conversion from the YUV color space into the RGB color space.

As described above, since the original color difference information of the pixels at the pixel positions other than the start pixel position within the pixel group is deleted, it is possible to decrease the amount of information of the image as a whole. As indicated by the pixel values 504, the color difference values of the pixels N7 and N8 within the object region are changed to those of the pixel N5 within the background region. The color difference values of the pixel N12 within the background region are changed to those of the pixel N9 within the object region.

When the color space of the image undergone such process is converted into the RGB color space, even if the chroma key composition is used, color misregistration occurs near boundaries 1 and 2. For example, although the pixel N12 is originally within the background region, it has color difference values within the object region since the above process has been executed. When the chroma key composition is performed, therefore, the pixel N12 is not regarded as a pixel within the background region.

This embodiment has been made in consideration of the above problems. In this embodiment, each pixel group is not allowed to extend across the boundary between the different attribute regions, for example, the object region and background region, and the start pixel position of each pixel group is controlled so that the corresponding pixel group falls within the same attribute region.

Figure 6:
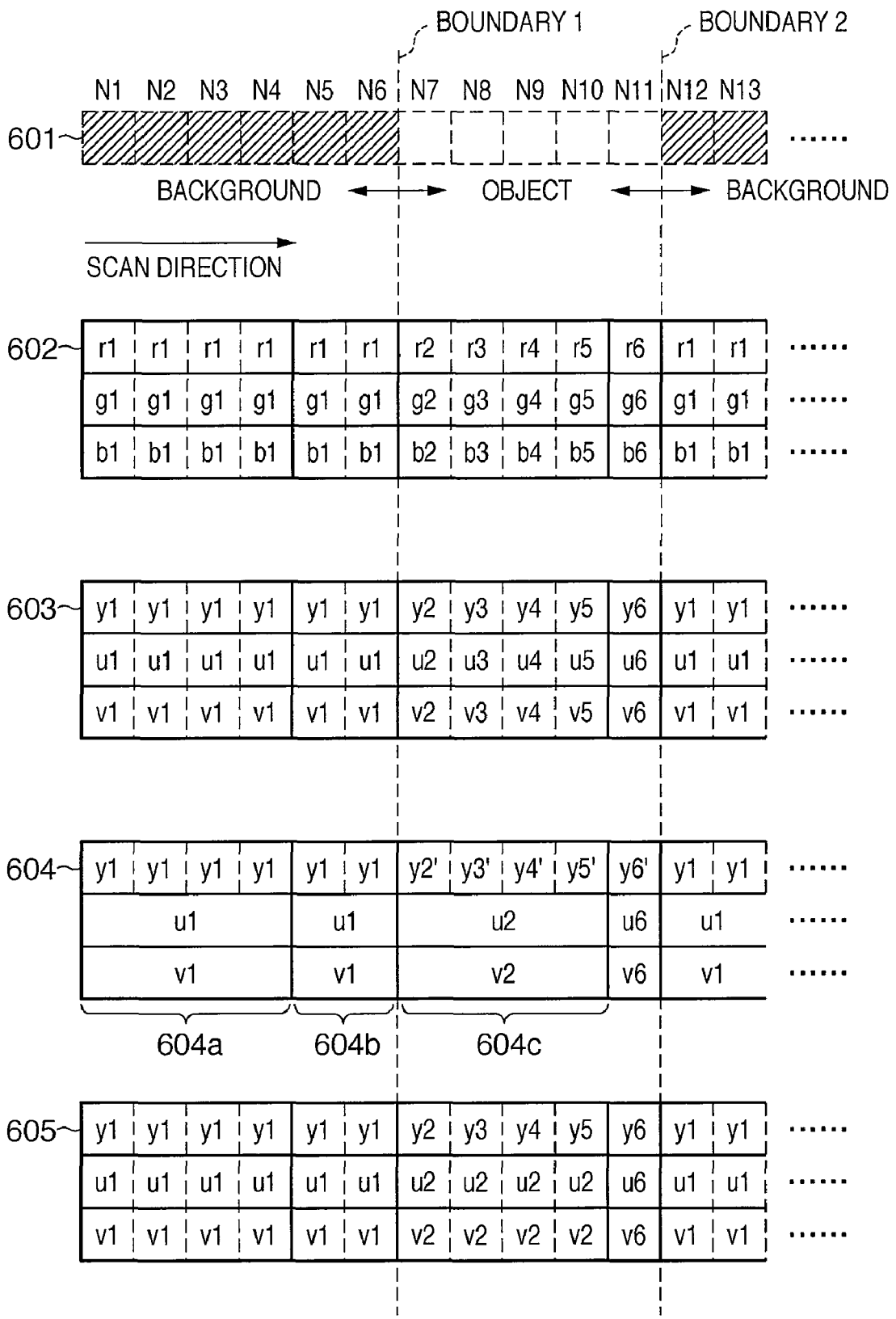
FIG. 6 is a view for explaining a process of equalizing color difference values for each pixel group by controlling the start pixel position of the corresponding pixel group.

FIG. 6 is a view for explaining a process of equalizing color difference values for each pixel group by controlling the start pixel position of the corresponding pixel group.

Referring to FIG. 6, reference numeral 601 denotes a pixel array including pixels N1 to N13. In this case, the pixels N1 to N6, N12, and N13 are located within the background region. The pixels N7 to N11 are located within the object region. As indicated by an arrow in FIG. 6, assume that a direction from the pixel N1 to the pixel N13 is a scan direction when processing or transmission is executed.

Reference numeral 602 denotes the RGB values of the pixels N1 to N13. For example, the R, G, and B values of the pixel N4 are r1, g1, and b1, respectively. The R, G, and B values of the pixel N8 are r3, g3, and b3, respectively.

Reference numeral 603 denotes the pixel values of the pixels N1 to N13 when the color space (RGB color space) of the pixels N1 to N13 is converted into the YUV color space.

This embodiment is also premised on that the pixels N1 to N13 are divided into groups each including four pixels and the color difference values are made equal in each pixel group (surrounded by thick solid lines), thereby decreasing the amount of information of the whole image. When, however, the attribute region to which a pixel of interest of a pixel group belongs is different from that to which a pixel (preceding pixel) at a pixel position closer to the start pixel position than the pixel of interest by one pixel belongs, pixels up to the preceding pixel are in one group in this embodiment. A new pixel group having the pixel position of interest as the start pixel position is set, and the same process is executed.

Reference numeral 604 denotes the pixel values of the pixels N1 to N13 when the color difference values are made equal to the representative color difference values for each pixel group. As indicated by the pixel values 604, the pixels within a first pixel group 604a belong to the same attribute region (background region). As in the pixel group 504a, color difference values u1 and v1 at the start pixel position within the first pixel group 604a are set to those of each pixel within the pixel group 604a. In a conventional manner, as indicated by a pixel group 504b, the second pixel group extends across the background region and the object region. Referring to FIG. 5, the attribute region (background region) to which the pixels N5 and N6 belong is different from that (object region) to which the pixels N7 and N8 belong. In this embodiment, assume that the pixels N5 and N6 are in a single pixel group 604b and the color difference values u1 and v1 at the start pixel position of the pixel group 604b are set to those of each pixel within the pixel group 604b. Subsequently, a pixel group which has the pixel position of the pixel N7 as the start pixel position, and includes four pixels is newly set. All pixels within the pixel group belong to the same attribute region (object region). Color difference values u2 and v2 at the start pixel position within a pixel group 604c are set to those of each pixel within the pixel group 604c. Note that luminance values y2', y3', y4', y5', and y6' within the pixel group 604c are obtained by incrementing luminance values in the luminance change unit 117.

Reference numeral 605 denotes the YUV pixel values of the pixels before the pixel values 604 of the pixels undergoes the color space conversion from the YUV color space into the RGB color space.

As shown in FIG. 6, the method of forming pixel groups according to this embodiment avoids forming a pixel group extending across different attribute regions, that is, equalizing color difference values across the different attribute regions. This resolves the problem of color misregistration between different attribute regions.

Figure 7:
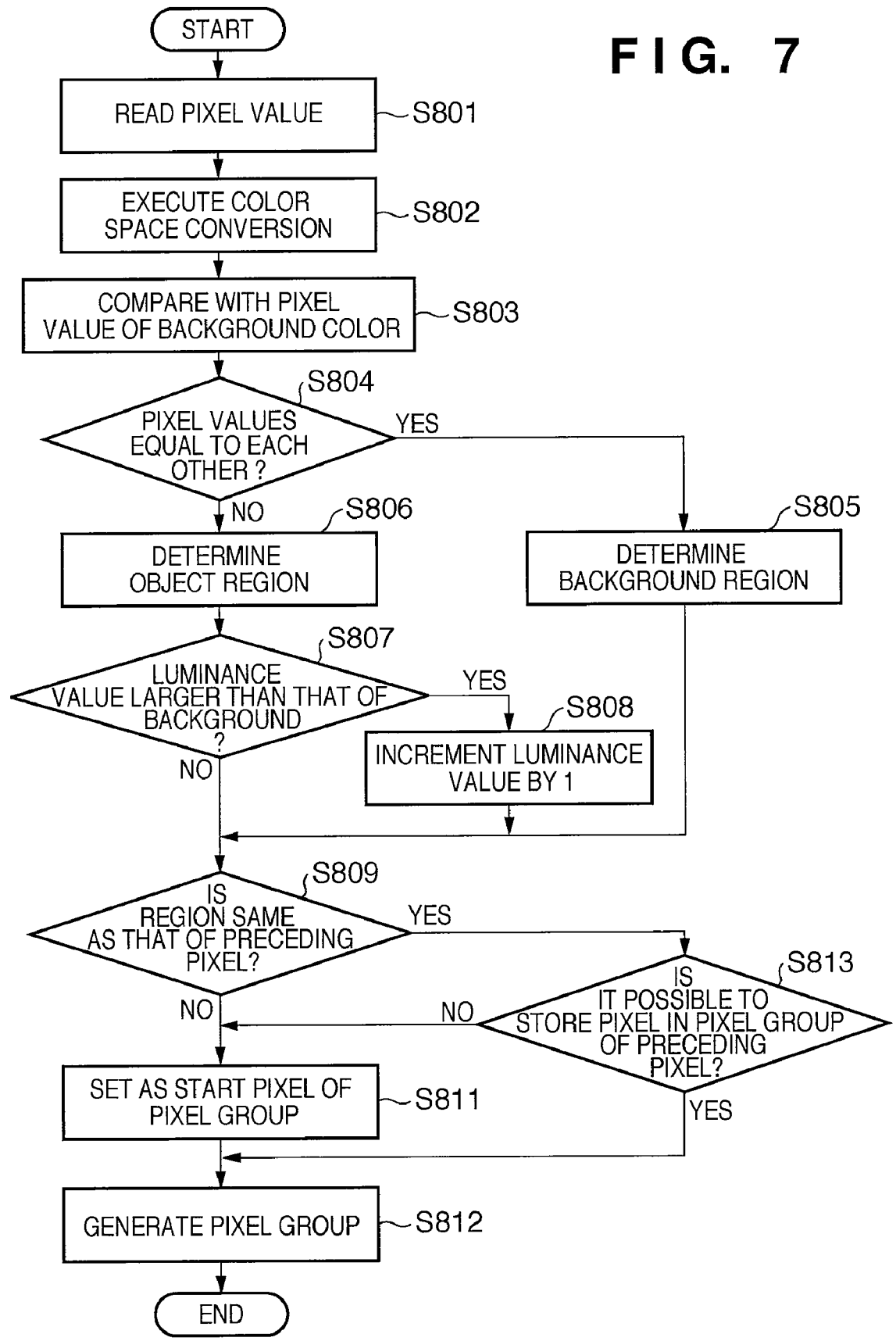
FIG. 7 is a flowchart of an image information generation process executed by a controller 302.

FIG. 7 is a flowchart of an image information generation process executed by the controller 302. The process according to the flowchart shown in FIG. 7 is executed for one pixel within the virtual space image. In practice, the process is performed for all the pixels forming the virtual space image. At the time of executing the process according to the flowchart shown in FIG. 7, the CG rendering unit 113 has generated a virtual space image within which the pixel values of the pixels represented by RGB values, and has sent the generated virtual space image to the subsequent color space conversion unit 114. The color space conversion unit 114 reads the pixel values of the pixels forming the virtual space image in, for example, a raster scan order.

In step S801, the color space conversion unit 114 reads the pixel value of a pixel of interest in a line of interest.

In step S802, if the pixel value read in step S801 represents an RGB value, the color space conversion unit 114 converts the pixel value into that representing a set of a luminance component and color difference components. The unit 114 sends the converted pixel value to the subsequent boundary detection unit 116. If the pixel value read in step S801 represents a luminance value and color difference values, the color space conversion unit 114 sends the pixel value to the subsequent boundary detection unit 116 without any change.

In step S803, the boundary detection unit 116 compares the luminance value and color difference values represented by the pixel value received from the color space conversion unit 114 with those held in the background information storage unit 115, respectively.

As a result of the comparison, if the pixel value received from the color space conversion unit 114 is equal to that held in the background information storage unit 115, the process advances to step S805 via step S804. In step S805, the pixel of interest whose pixel value has been read in step S801 is determined to be located within the background region.

On the other hand, if the pixel value received from the color space conversion unit 114 is not equal to that held in the background information storage unit 115, the process advances to step S806 via step S804. In step S806, the pixel of interest whose pixel value has been read in step S801 is determined to be located within the object region.

In step S807, the luminance change unit 117 compares the magnitude of the luminance value x of the pixel of interest located within the object region with that of the luminance value y held in the background information storage unit 115. As a result of the comparison, if $x \geq y$, the process advances to step S808. In step S808, the luminance value x is incremented. The increment is not particularly limited. In this embodiment, assume that the increment is "+1".

The processes in steps S807 and S808 are executed to differentiate the pixel value of each pixel within the object region from that of each pixel within the background region and to clearly indicate the pixel whose pixel value has been differentiated as such. As long as the same purpose is achieved, the processes in steps S807 and S808 are not limited to them.

In step S809, the conversion control unit 118 executes the following process. The unit 118 specifies the attribute region determined in step S805 or S806, within which a pixel (preceding pixel), located at a pixel position adjacent to the pixel of interest, whose pixel value has been read in step S801 immediately before the pixel of interest is located. The unit 118 determines whether the specified attribute region is the same as that determined in step S805 or S806 within which the pixel of interest is located. That is, the unit 118 determines whether the preceding pixel is located within the same attribute region as that of the pixel of interest.

As a result of the determination, if it is determined that the preceding pixel is not located within the same attribute region as that of the pixel of interest, the process advances to step S811; otherwise, the process advances to step S813. Note that if the pixel immediately before the pixel of interest does not exist (if the pixel of interest is located at the leftmost position of the image), it is determined that the preceding pixel is not located within the same attribute region as that of the pixel of interest.

If it is determined that the preceding pixel is located within the same attribute region as that of the pixel of interest, the pixel of interest can generally belong to the pixel group to which the preceding pixel belongs. However, one pixel group can only include at most the number of pixels of a pixel array having the length L. It is therefore determined how many pixels belong to the pixel group to which the preceding pixel belongs at this time. If the number of pixels belonging to the pixel group to which the preceding pixel belongs is less than the number of pixels of the pixel array having the length L, it is possible to include the pixel of interest within the pixel group. If the number of pixels belonging to the pixel group to which the preceding pixel belongs is equal to the number of pixels of the pixel array having the length L, it is impossible to include the pixel of interest within the pixel group, and a new pixel group which has the pixel of interest as the start pixel position needs to be provided.

In step S813, the conversion control unit 118 executes the above-described process, and determines whether it is possible to include the pixel of interest within the same pixel group as that of the preceding pixel. In other words, it is determined whether the length of the pixel array of pixels which belong to the same attribute region as that of the start pixel position has reached the length L (four pixels in this embodiment) at the pixel position subsequent to the start pixel position within the pixel group to which the preceding pixel belongs.

As a result of the determination process, if the length has not reached the length L, it is determined that it is possible to include the pixel of interest within the same pixel group as that of the preceding pixel. The process advances to step S812.

In step 812, the pixel group generation unit 119 records, adjacent to the already recorded data, the luminance value of the pixel of interest in the data packet set for the line of interest.

On the other hand, if it is determined in step S813 that the length has reached the length L, it is determined that it is impossible to include the pixel of interest in the same pixel group as that of the preceding pixel. The process advances to step S811.

In step S811, the conversion control unit 118 sets the pixel position of the pixel of interest as the start pixel position.

In step S812, the pixel group generation unit 119 records, adjacent to the already recorded data in the data packet set for the line of interest, the luminance value and color difference values of the pixel (the pixel of interest) at the pixel position which has been set as the start pixel position in step S811.

In other words, the above-described process according to the flowchart of FIG. 7 is as follows.

For each line of the image formed by the two attribute regions, i.e., the non-background region and the background region which includes pixels each having a predetermined luminance value and color difference values, the luminance values and color difference values of the pixels of the line are sequentially read. It is then determined based on the read luminance value and color difference values of the pixel of interest on the line of interest whether the pixel of interest belongs to the background region or the non-background region. If the attribute region to which the pixel of interest belongs is different from that to which the preceding pixel read immediately before the pixel of interest belongs, the following process is executed.

The luminance value and color difference values of the pixel of interest are recorded, in this order, adjacent to the already recorded data in the data packet set for the line of interest. On the other hand, if the attribute region to which the pixel of interest belongs is the same as that to which the preceding pixel belongs, the luminance value of the pixel of interest is recorded adjacent to the already recorded data in the data packet.

As described above, the data packet which is completed by executing the above recording process of the data packet for the pixels of the line is sent to the HMD 301 side.

Figure 8:
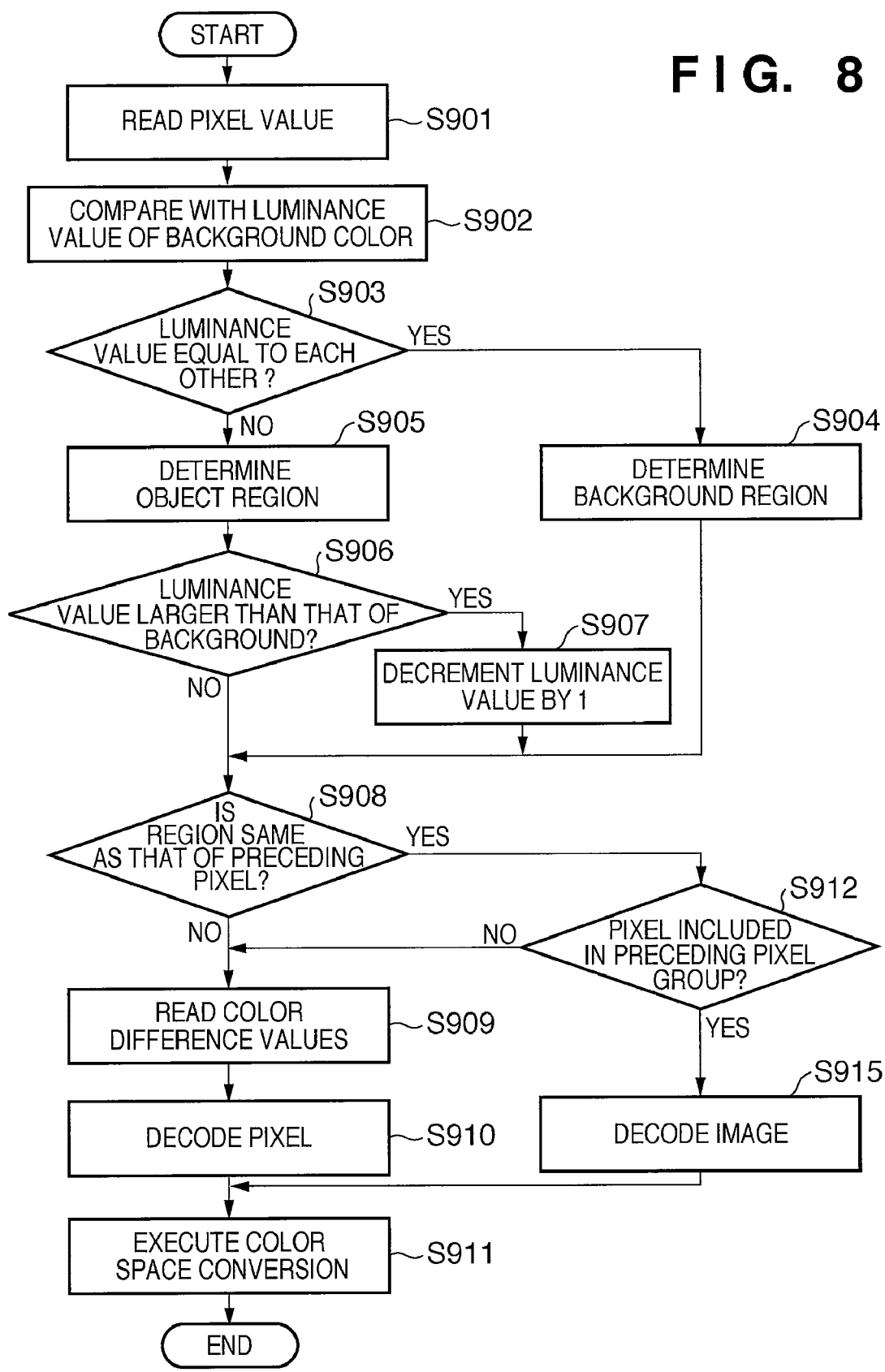
FIG. 8 is a flowchart of a process of decoding a data packet and restoring a pixel having an RGB value on the HMD 301 side.

A process of decoding the data packet and restoring the pixels having the RGB values on the HMD 301 side will be described below with reference to FIG. 8 which shows the flowchart of the process.

In step S901, the boundary determination unit 108 reads, as a reading value, the luminance value or color difference values recorded in the received data packet from the top of the data packet.

In step S902, the boundary determination unit 108 determines whether the luminance value read as the reading value is that of the pixel belonging to the non-background region, or that of the pixel belonging to the background region. In this determination process, the luminance value read as the reading value is compared with the luminance value held in the background information storage unit 107. As a result of the comparison, if the luminance values are equal to each other, the process advances to step S904 via step S903. In step S904, it is determined that the pixel having the luminance value read as the reading value is located within the background region. Alternatively, if the luminance values are not equal to each other, the process advances to step S905 via step S903. In step S905, it is determined that the pixel having the luminance value read as the reading value is located within the object region.

In step S906, the luminance restoration unit 109 compares the magnitude of the luminance value x (the luminance value which has been determined to belong to the object region) read as the reading value with that of the luminance value y held in the background information storage unit 107. If x>y, the process advances to step S907.

In step S907, the luminance restoration unit 109 returns the luminance value x by the change made by the luminance change unit 117. For example, if the luminance change unit 117 has incremented the luminance value by "+1", the luminance restoration unit 109 subtracts "+1" from the luminance value.

In step S908, the boundary determination unit 108 determines whether the attribute region to which the pixel (to be referred to as a decoding target pixel hereinafter) whose reading value has been read in step S901 belongs is the same as that to which the pixel whose reading value has been read immediately before the decoding target pixel belongs.

Consequently, if it is determined that the attribute regions are the same, the process advances to step S912; otherwise, the process advances to step S909.

In step S909, the boundary determination unit 108 reads the subsequent color difference values (color difference values of interest) corresponding to the luminance value read in step S901. The read color difference values are set as a setting value to be used for restoring a pixel together with luminance values to be read after the color difference values (the color difference values of interest).

In step S910, the boundary determination unit 108 restores a pixel on the basis of the luminance value read in step S901 (or the luminance value corrected in step S907) and the color difference values read in step S909.

If it has been successively determined in step S908 the number of times which is equal to the number obtained by subtracting one from the number of pixels of the pixel array having the length L that the attribute regions are the same, the process advances from step S908 to step S909 via step S912.

Alternatively, if it has not been successively determined in step S908 the number of times which is equal to the number obtained by subtracting one from the number of pixels of the pixel array having the length L that the attribute regions are the same, the process advances from step S908 to step S915 via step S912.

In step S915, the boundary determination unit 108 restores a pixel on the basis of the luminance value read in step S901 (or the luminance value corrected in step S907) and the color difference values set as the setting value.

In step S911, display data of the restored pixel is generated by converting the luminance value and color difference values of the pixel into an RGB value.

As described above, according to this embodiment, since a pixel group is not formed across the different attribute regions, i.e., color difference values are not made equal across the different attribute regions, it is possible to resolve the above color misregistration between the different attribute regions.

In this embodiment, a communication error between the HMD 301 and the controller 302 is not especially considered. As measures against this problem, an error control function using, e.g., an error correcting code, or an interpolation function of interpolating an image, for which a communication error has been occurred, by using the preceding image information or image information of the other image of the stereoscopic image on the HMD 301 side may be provided. This makes it possible to restore the correct image information and reduce the color misregistration even if a communication error occurs.

Although the boundary detection unit 116 detects the boundaries after the conversion in the color space conversion unit 114 in the above explanation, this order may be changed. In this case, the background information storage unit 115 stores the RGB pixel values of the background color and the luminance value after the conversion. The boundary detection unit 116 compares the RGB pixel values of the background color with the pixel values of the CG image before the conversion, and detects a boundary in accordance with whether the values are equal to each other.

Second Embodiment

In the first embodiment, the HMD 301 can discriminate the attribute regions by controlling the luminance values within the object region in the virtual space image on the controller 302 side. This makes it possible to specify the boundary portion between the attribute regions. In this embodiment, the controller 302 attaches boundary information representing the boundary portion between the object region and the background region to the data packet, and sends it to the HMD 301 without controlling the luminance values within the object region.

Figure 9:
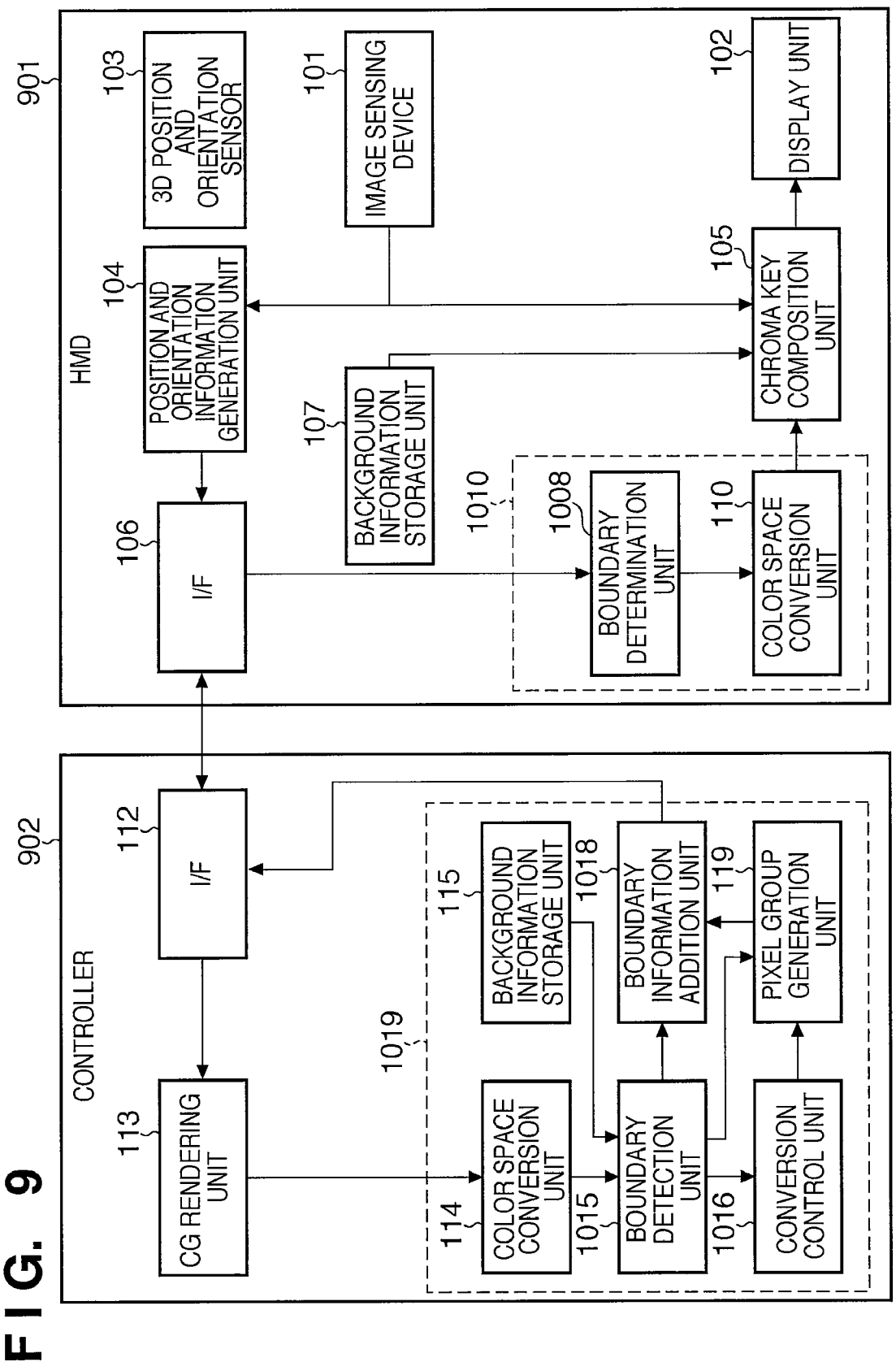
FIG. 9 is a block diagram showing a functional arrangement example of a system according to the second embodiment of the present invention.

FIG. 9 is a block diagram showing a functional arrangement example of a system according to this embodiment. As shown in FIG. 9, the system according to this embodiment comprises an HMD (Head Mounted Display) 901 and a controller 902. The HMD 901 and the controller 902 are connected to be able to communicate data with each other. In FIG. 9, the same reference numerals as those in FIG. 1 denote the same components, and a description thereof will be omitted.

Upon reception of a virtual space image undergone color space conversion from a color space conversion unit 114, a boundary detection unit 1015 of the controller 902 reads a luminance value and color difference values of a pixel (pixel of interest) forming the virtual space image which has undergone the color space conversion, similarly to the boundary detection unit 116 shown in FIG. 1. The unit 1015 determines whether the read luminance value and color difference values are equal to those held in the background information storage unit 115, respectively. If the values are equal, the unit 1015 sends information (attribute region information) representing that the pixel of interest is located within the background region to a subsequent conversion control unit 1016 and boundary information addition unit 1018. On the other hand, if it is determined that the values are not equal, the unit 1015 sends information (attribute region information) representing that the pixel of interest is located within the object region to the subsequent conversion control unit 1016 and boundary information addition unit 1018.

The conversion control unit 1016 detects the boundary between the background region and the non-background region on the basis of the attribute region information for each pixel which has been received from the boundary detection unit 1015. Upon detection of the boundary, the unit 1016 executes the same process as in the first embodiment, and specifies the start pixel position. The unit 1016 sends the specified start pixel position to a subsequent pixel group generation unit 119.

The pixel group generation unit 119 generates a data packet for each line, as described in the first embodiment. The unit 119 sends the generated data packet for each line to the boundary information addition unit 1018.

Upon reception of the data packet for a line of interest from the pixel group generation unit 119, the boundary information addition unit 1018 sends the data packet together with the attribute region information for each pixel of the line of interest to an I/F 112.

Upon reception of the data packet of the line of interest together with the attribute region information for each pixel of the line of interest via an I/F 106, a boundary determination unit 1008 specifies a boundary position on the line of interest on the basis of the attribute region information. The operation of the boundary determination unit 1008 is the same as that of the boundary determination unit 108 except for the method of detecting the boundary between the background region and the non-background region.

Figure 10:
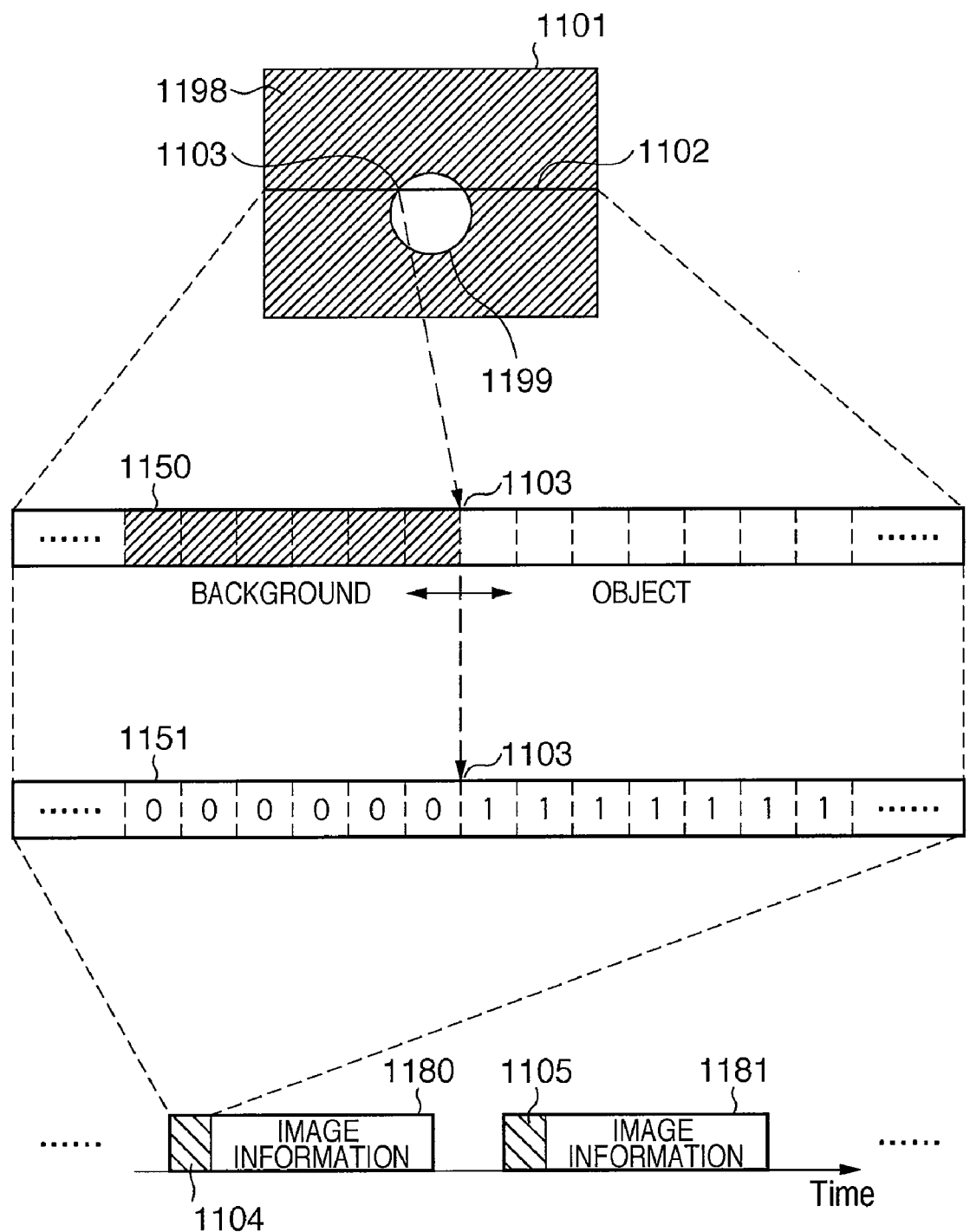
FIG. 10 is a view for explaining a process, executed on the controller 902 side, for sending a data packet and attribute region information on each pixel from the controller 902 to an HMD 901.

FIG. 10 is a view for explaining a process, executed on the controller 902 side, for sending the data packet and the attribute region information for each pixel from the controller 902 to the HMD 901.

Referring to FIG. 10, reference numeral 1101 denotes a virtual space image, which includes two attribute regions, i.e., a background region 1198 and an object region 1199. Reference numeral 1102 denotes a line of interest; and 1103, a boundary position between the background region 1198 and the object region 1199 on the line of interest. The following explanation will apply to any line other than the line of interest, and to other boundary positions on the line of interest.

Reference numeral 1150 denotes each pixel on the line of interest.

Reference numeral 1151 denotes attribute region information for each pixel 1150. Referring to FIG. 10, the attribute region information for the pixel belonging to the background region 1198 indicates "0", and the attribute region information for the pixel belonging to the object region 1199 indicates "1". The information for identifying the attribute regions is not limited to this.

Reference numeral 1104 denotes attribute region information corresponding to the data packet 1180; and 1105, attribute region information corresponding to the data packet 1181. That is, in FIG. 10, the attribute region information obtained for each pixel of the line of interest is added to the data packet generated for the line of interest. A set of the attribute region information and data packet for each line is sent to the HMD 901. This enables the HMD 901 to determine the attribute region of each data in the data packet by referring to the attribute region information which has been added to the data packet as a header.

Although a bit string containing all the attribute region information for the pixels of a line may be transmitted intact, it may be encoded using a encoding method suitable for the binary bit string, such as run-length encoding, and then transmitted. As described above, the method shown in FIG. 10 can compress and encode the attribute region information, and is preferable in this point.

Figure 11:
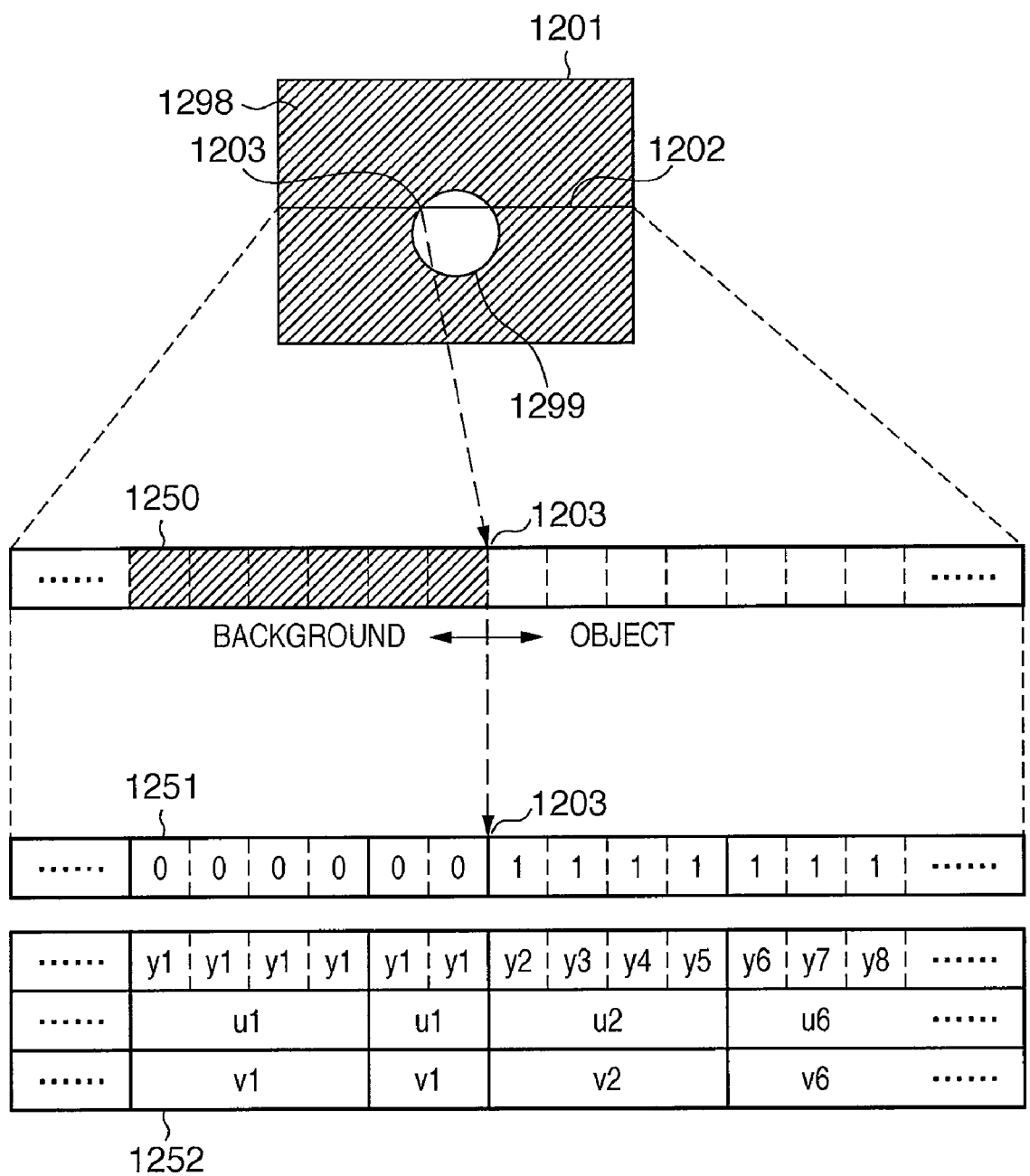
FIG. 11 is a view for explaining a process, executed on the controller 902 side, for sending the data packet and the attribute region information on each pixel from the controller 902 to the HMD 901.

FIG. 11 is a view for explaining a process, executed on the controller 902 side, for sending the data packet and the attribute region information for each pixel from the controller 902 to the HMD 901.

Referring to FIG. 11, reference numeral 1201 denotes a virtual space image, which includes two attribute regions, i.e., a background region 1298 and an object region 1299. Reference numeral 1202 denotes a line of interest; and 1203, a boundary position between the background region 1298 and the object region 1299 on the line of interest. The following explanation will apply to any line other than the line of interest, and to other boundary positions on the line of interest.

Reference numeral 1250 denotes each pixel on the line of interest.

Reference numeral 1251 denotes attribute region information for each pixel 1250. Referring to FIG. 11, the attribute region information for the pixel belonging to the background region 1298 indicates "0", and the attribute region information for the pixel belonging to the object region 1299 indicates "1". The information for identifying the attribute regions is not limited to this.

Reference numeral 1252 denotes a data packet for the line of interest 1202. Referring to FIG. 11, for each pixel in the data packet generated for the line of interest, corresponding attribute region information is added. A set of the attribute region information and data packet for each line is sent to the HMD 901. This enables the HMD 901 to determine the attribute region of each pixel in the data packet by referring to the attribute region information of the corresponding pixel.

For example, as a method of adding the attribute region information to the data of each pixel, the following method is available. If the luminance data has 8 bits, the data is extended to 9-bit data, and the most significant bit or the least significant bit of the 9-bit data is assigned to the attribute region information having 1 bit. The 8-bit data may be converted into 7-bit data by deleting the least significant bit of the 8-bit data, and the 1-bit attribute region information may be added to the 7-bit data, thus obtaining an 8-bit data.

As described above, there exist various methods of adding the attribute region information to the data packet, and each method has both merits and demerits. Therefore, a system designer can decide a method to be employed, as needed.

As described above, according to this embodiment, the following effects can be obtained in addition to the those explained in the first embodiment. That is, although an information amount to be transferred from the controller 902 to the HMD 901 increases, it is possible to simplify the arrangement of the HMD 901 as is apparent from comparison of FIGS. 1 and 9.

As is well known, since the HMD 901 is worn by an observer on the head, and it is desirable that the HMD 901 is more light in weight. By simplifying the arrangement of the HMD 901, it is possible to reduce the weight of the HMD 901. This embodiment is thus preferable in this point.

In this embodiment, the measures against the communication error as described in the first embodiment may be taken.

Third Embodiment

Figure 12:
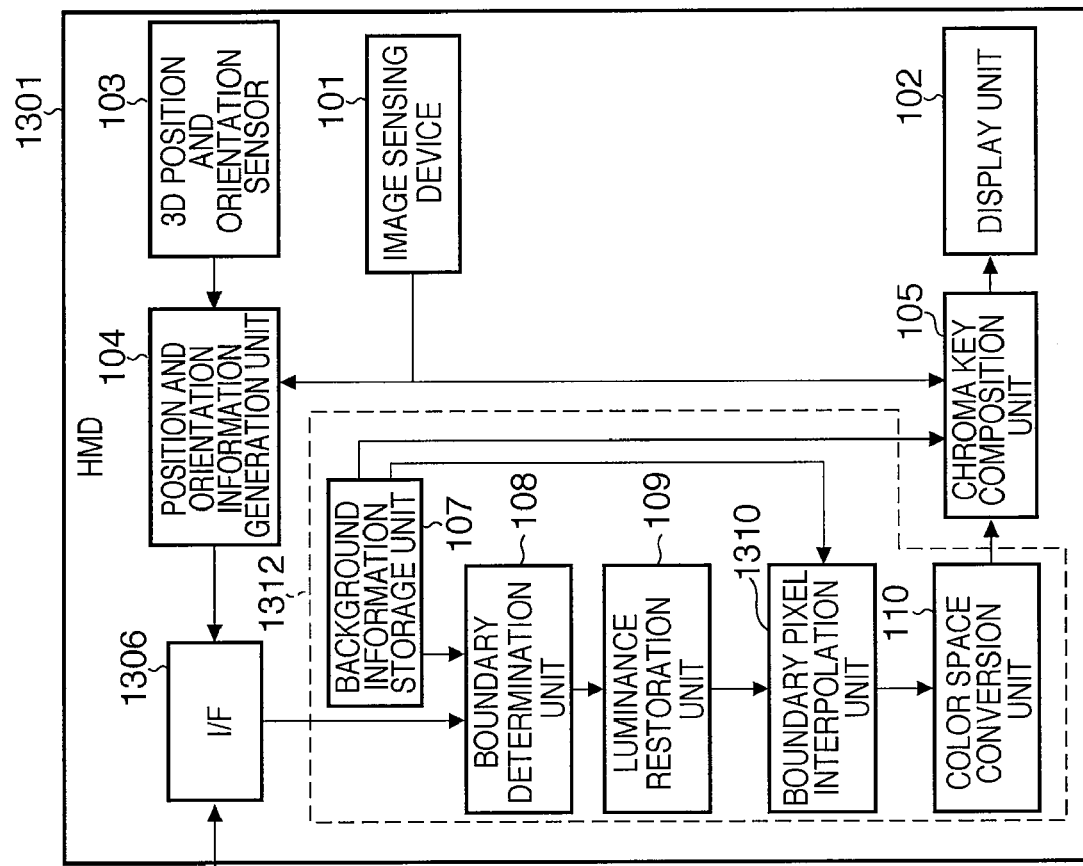
FIG. 12 is a block diagram showing a functional arrangement example of a system according to the third embodiment of the present invention.

FIG. 12 is a block diagram showing a functional arrangement example of a system according to this embodiment. In FIG. 12, the same reference numerals as those in FIG. 1 denote the same components, and a description thereof will be omitted.

The operation of a conversion device 1319 within a controller 1302 will be explained first. The operations of the components forming the conversion device 1319 are as described in the first embodiment, and a cooperative operation between the components will be explained here.

A color space conversion unit 114 converts the pixel value of each pixel forming a virtual space image generated by a CG rendering unit 113 from an RGB value to a pixel value representing a luminance value and color difference values.

A boundary detection unit 116 notifies a luminance change unit 117 whether an attribute region of a pixel of interest is a background region or an object region. The luminance change unit 117 changes the luminance value of a pixel located within the object region.

Consequently, the luminance change unit 117 sends, to a pixel group generation unit 1399, a virtual space image obtained by changing the luminance value of the pixel belonging to the object region in the virtual space image sent from the color space conversion unit 114.

For each line forming the received virtual space image, the pixel group generation unit 1399 divides the line into groups each including 4 pixels. For each pixel group obtained by dividing the line, the unit 1399 updates the color difference values of all pixels within the pixel group with those of a pixel at the start position of the pixel group. The unit 1399 records, in a data packet set for each line, for each pixel group, the luminance value and color difference values of the pixel at the start position, and the luminance values of the pixels subsequent to the start position.

The data packet generated by the pixel group generation unit 1399 is sent to an I/F 1313. The I/F 1313 send the data packet to an HMD 1301.

The operation of a decoding device 1312 within the HMD 1301 will be described next.

A boundary pixel interpolation unit 1310 receives a virtual space image obtained by ignoring the boundary of the attribute regions, and restoring pixels having the same color difference values for each pixel group having the fixed length. The boundary pixel interpolation unit 1310 further divides the pixels at the boundary between the attribute regions into pixel groups in the virtual space image.

The resultant virtual space image obtained by the boundary pixel interpolation unit 1310 is input to a color space conversion unit 110.

Figure 13:
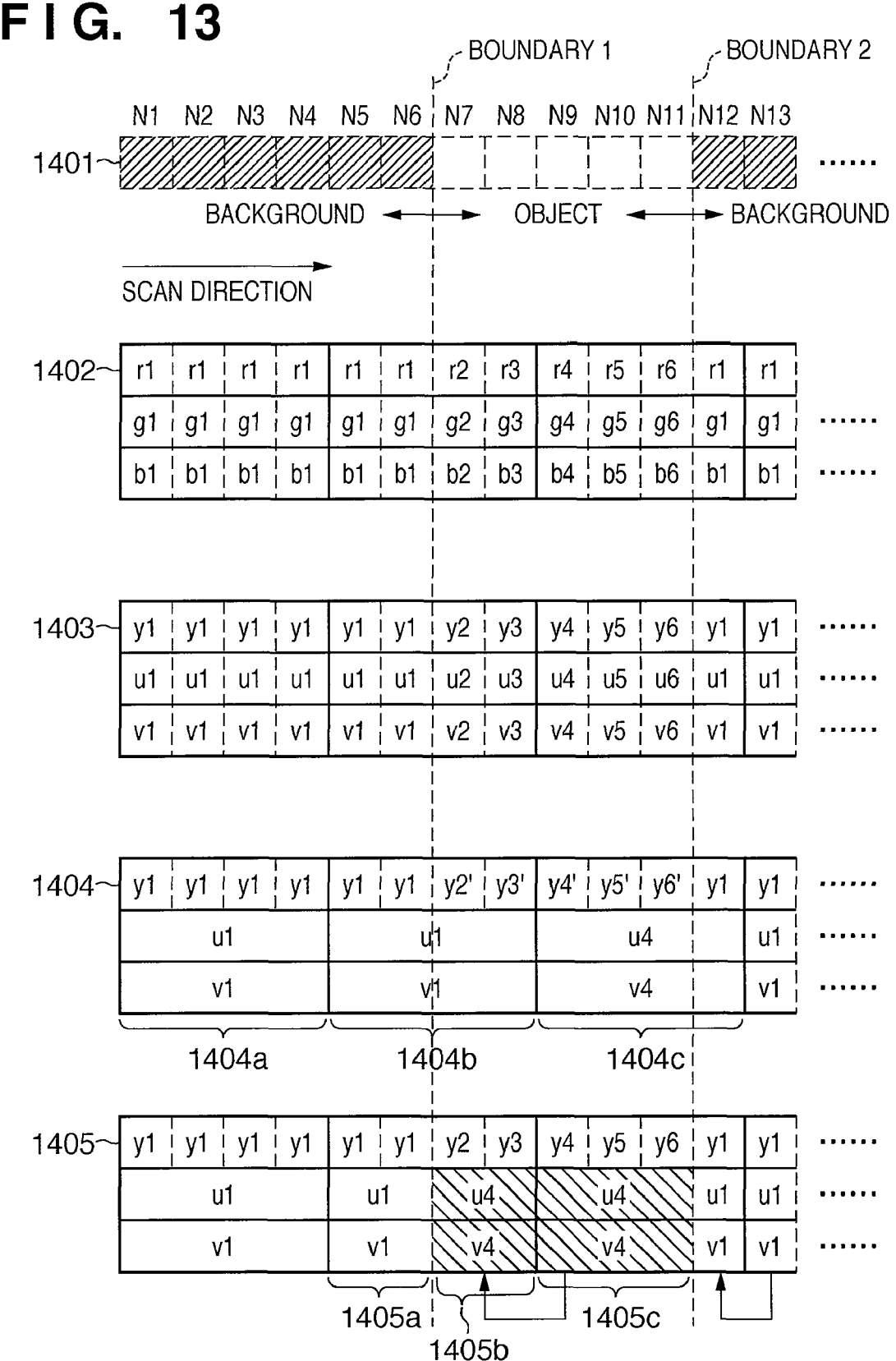
FIG. 13 is a view for explaining a process execute by a boundary pixel interpolation unit 1310.

FIG. 13 is a view for explaining a process executed by the boundary pixel interpolation unit 1310.

Referring to FIG. 13, reference numeral 1401 denotes a pixel array including pixels N1 to N13. In this case, the pixels N1 to N6, N12, and N13 are located within the background region. The pixels N7 to N11 are located within the object region. As indicated by an arrow in FIG. 13, assume that a direction from the pixel N1 to the pixel N13 is a scan direction when processing or transmission is executed.

Reference numeral 1402 denotes the RGB values of the pixels N1 to N13. For example, the R, G, and B values of the pixel N4 are r1, g1, and b1, respectively. The R, G, and B values of the pixel N8 are r3, g3, and b3, respectively.

Reference numeral 1403 denotes the pixel values of the pixels N1 to N13 when the color space (RGB color space) of the pixels N1 to N13 is converted into the YUV color space.

In this case, the pixels N1 to N13 are divided into groups each including four pixels. In each pixel group (surrounded by thick solid lines), color difference values are made equal, thereby decreasing the information amount of the image as a whole. Assume that the color difference values of the pixel at the start pixel position within a pixel group is defined as representative color difference values of the pixel group, and the color difference values of the pixels within the pixel group are made equal to the representative color difference values.

Reference numeral 1404 denotes the pixel values of the pixels N1 to N13 when the color difference values are made equal to the representative color difference values for each pixel group. As indicated by the pixel values 1404, color difference values u1 and v1 at the start pixel position of a first pixel group 1404a are set to those of each pixel within the pixel group 1404a. The color difference values u1 and v1 at the start pixel position of a second pixel group 1404b are set to those of each pixel within the pixel group 1404b. Color difference values u4 and v4 at the start pixel position of a third pixel group 1404c are set to those of each pixel within the pixel group 1404c. Note that luminance values y2', y3', y4', y5', and y6' are obtained by incrementing luminance values in the luminance change unit 117.

The controller 1302 sends the data packet in which data for each pixel group are recorded to the HMD 1301.

Reference numeral 1405 denotes the luminance values and color difference values of pixels interpolated by the boundary pixel interpolation unit 1310. If all pixels within a pixel group are located within the same attribute region, the boundary pixel interpolation unit 1310 executes no process for the pixel group. A pixel group, such as the pixel group 1404b, which extends across the background region and the object region is further divided into pixel groups. In the case of FIG. 13, the pixel group 1404b is divided into a pixel group 1405a including the pixels N5 and N6 and a pixel group 1405b including the pixels N7 and N8. As color difference values of the pixel group 1405b, the color difference values of the subsequent pixel group are given. This makes it possible to divide the pixel group extending across the two attribute regions into two pixel groups each of which belongs to only one of the attribute regions.

Therefore, the pixels which originally exist within the background region are given the color difference values within the background region, thereby reducing the above problem of color misregistration.

On a pixel at a boundary, such as boundary 2, at which the object region is switched to the background region in the main scan direction, a correction process of substituting the color difference values of the pixel for those of the adjacent pixel group may be executed. On a pixel at a boundary, such as boundary 1, at which the background region is switched to the object region, correction process by executing a linear interpolation using the pixel values of a neighboring pixel, a filtering process, or lie like, may be executed. That is, separate correction processes can be performed. The above neighboring pixel may indicate not only a pixel adjacent to the pixel at the boundary in the main scan direction but also a pixel adjacent to the pixel at the boundary in the vertical direction or a pixel within the object region included in a pixel block which is formed by a plurality of pixels including the pixel at the boundary.

By executing such correction process, it is possible to reproduce the correct background color, and to make the color misregistration within the object region relatively inconspicuous. It is therefore possible to reproduce a high-quality CG image on the HMD side, even if the transmission amount decreases.

As described above, according to this embodiment, the arrangement of the controller can be simplified.

In this embodiment, to specify the boundary between attribute regions, the start pixel position is specified, similarly to the first embodiment. As a process of specifying the boundary between the attribute regions, attribute region information may be obtained as described in the second embodiment. A system designer can decide as needed whether the arrangement described in the first embodiment or that described in the second embodiment is employed to specify the boundary between the attribute regions.

In this embodiment, the measures against the communication error as described in the first embodiment may be taken.

In the above embodiments, a pixel value is substituted for a luminance component and color difference components. However, the pixel value may be substituted within the RGB color space.

Fourth Embodiment

A system which can selectively use the functions described in any two of the first to third embodiments may be designed. The system to be designed is determined in accordance with the use environment of the system. For example, the following system is applicable.

Assume that data are wirelessly communicated between an HMD and a controller. In accordance with the radio wave conditions in wireless communication, the system operation is switched from one operation to the other, as will be described later.

If an information amount to be transmitted to the communication partner is required to be as small as possible due to the bad radio wave conditions, a system operation, according to the first embodiment, of transmitting only a data packet without using attribute region information is executed. If the radio wave conditions are not so bad, a system operation, according to the second embodiment, of adding attribute region information to the data packet and transmitting it is executed.

The system user may manually switch the operation at his or her discretion as needed, or the operation may be automatically switched in accordance with a detection result by an apparatus which detects the radio wave conditions. The switching conditions are not limited to them, as a matter of course.

Fifth Embodiment

In the above embodiments, a controller executes all processes of generating a virtual space image on the basis of position and orientation information, and converting each pixel value of the generated virtual space image from an RGB value to a set of a luminance value and color difference values. An external apparatus may execute some or all of the processes. For example, upon reception of the position and orientation information from an HMD, the controller sends the information to an external PC (Personal Computer). After generating a virtual space image on the basis of the position and orientation information, the PC may convert each pixel value of the generated virtual space image from an RGB value to a set of a luminance value and color difference values, and return the converted virtual space image to the controller.

Other Embodiments

The object of the present invention is achieved by the following process. That is, a recording medium (or storage medium) which records software program codes (computer programs) for implementing the functions of the above-described embodiments is supplied to a system or apparatus. The storage medium is a computer-readable storage medium. A computer (or a CPU or MPU) of the system or apparatus reads out and executes the program codes stored in the recording medium. In this case, the program codes read out from the recording medium implement the functions of the above-described embodiments, and the recording medium which records the program codes constitutes the present invention.

The present invention includes a case in which the functions of the above-described embodiments are implemented when the computer executes the readout program codes and an operating system (OS) or the like running on the computer performs some or all of actual processes on the basis of the instructions of the program codes.

Furthermore, the present invention includes a case in which, after the program codes read out from the recording medium are written in the memory of a function expansion card inserted into the computer or the memory of a function expansion unit connected to the computer, the CPU of the function expansion card or function expansion unit performs some or all of actual processes on the basis of the instructions of the program codes and thereby implements the functions of the above-described embodiments.

When the present invention is applied to the recording medium, the recording medium stores the program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-153392, filed Jun. 8, 2007, which is hereby incorporated by reference herein in its entirety.

What is claimed is:

1. An image processing apparatus comprising:
a processor which is programmed to control:
an input unit adapted to input an image formed by attribute regions which are a non-background region and a background region including pixels each having a preset luminance value and color difference value;
a read unit adapted to sequentially read a luminance value and color difference value of each pixel forming the image;
a determination unit adapted to determine, based on a luminance value and color difference value of a pixel of interest read by the read unit, whether the pixel of interest belongs to the background region or the non-background region;
a recording unit adapted to record the luminance value and color difference value of the pixel of interest as data of a group different from that to which a preceding pixel read by the read unit immediately before the pixel of interest belongs if an attribute region to which the pixel of interest belongs is different from that to which the preceding pixel belongs, and record the luminance value of the pixel of interest adjacent to data already recorded in the group to which the preceding pixel belongs if the attribute region to which the pixel of interest belongs is the same as that to which the preceding pixel belongs; and an output unit adapted to output the data recorded by the recording unit.

2. The apparatus according to claim 1, further comprising:
a holding unit adapted to hold the data of the preset luminance value and color difference value,
wherein the determination unit makes the determination on the basis of comparison of the luminance value of the pixel of interest read by the read unit and the luminance value held in the holding unit, and comparison of the color difference value of the pixel of interest read by the read unit and the color difference value held in the holding unit.

3. The apparatus according to claim 1, further comprising:
a unit adapted to control the luminance value of the pixel, which has been determined to belong to the non-background region by the determination unit, to be different from the preset luminance value,
wherein the recording unit uses the luminance value, on which the control has been executed, as the luminance value of the pixel belonging to the non-background region.

4. The apparatus according to claim 1, further comprising:
a unit adapted to generate attribute region information representing an attribute region of each pixel which has been determined by the determination unit,
wherein the output unit outputs the attribute region information in addition to the data.

5. The apparatus according to claim 1, wherein the image input by the input unit is a virtual space image as a target of chroma key composition with a physical space image, and the background region is formed by pixels each having a luminance value and color difference value representing a chroma key color.

6. The apparatus according to claim 1, the apparatus generating display data of the image by decoding the data output from the output unit, comprising:
a reception unit adapted to receive the data output by the output unit;
a unit adapted to read, as a reading value from the top of the data, a luminance value or color difference value recorded in the data;
a unit adapted to determine, if the luminance value is read as the reading value, whether the read luminance value is that of a pixel belonging to the non-background region or that of a pixel belonging to the background region;
a unit adapted to read, if an attribute region to which a pixel corresponding to the read luminance value of interest belongs is different from that to which a pixel corresponding to a luminance value read immediately before the luminance value of interest belongs, a subsequent color difference value corresponding to the luminance value of interest as a color difference value of interest, set the color difference value of interest as a setting value to be used for restoring a pixel together with a luminance value to be read after the color difference value of interest, and restore a pixel on the basis of the luminance value of interest and the color difference value of interest;

a unit adapted to restore, if the attribute region to which the pixel corresponding to the read luminance value of interest belongs is the same as that to which the pixel corresponding to the luminance value read immediately before the luminance value of interest belongs, a pixel on the basis of the read luminance value of interest and the color difference value set as the setting value before the luminance value of interest is read; and
a unit adapted to generate display data by converting a color space of the restored pixel.

7. An image processing method comprising:
an input step of inputting an image formed by attribute regions which are a non-background region and a background region including pixels each having a preset luminance value and color difference value;
a read step of sequentially reading a luminance value and color difference value of each pixel forming the image;
a determination step of determining, based on a luminance value and color difference value of a pixel of interest read in the read step, whether the pixel of interest belongs to the background region or the non-background region;
a recording step of recording the luminance value and color difference value of the pixel of interest as data of a group different from that to which a preceding pixel read in the read step immediately before the pixel of interest belongs if an attribute region to which the pixel of interest belongs is different from that to which the preceding pixel belongs, and recording the luminance value of the pixel of interest adjacent to data already recorded in the group to which the preceding pixel belongs if the attribute region to which the pixel of interest belongs is the same as that to which the preceding pixel belongs; and
an output step of outputting the data recorded in the recording step.

8. The method according to claim 7, the method being executed by an image processing apparatus which generates display data of the image by decoding the data output in the output step, comprising:
a reception step of receiving the data output in the output step;
a step of reading, as a reading value from the top of the data, a luminance value or color difference value recorded in the data;
a step of determining, if the luminance value is read as the reading value, whether the read luminance value is that of a pixel belonging to the non-background region or that of a pixel belonging to the background region;
a step of reading, if an attribute region to which a pixel corresponding to the read luminance value of interest belongs is different from that to which a pixel corresponding to a luminance value read immediately before the luminance value of interest belongs, a subsequent color difference value corresponding to the luminance value of interest as a color difference value of interest, setting the color difference value of interest as a setting value to be used for restoring a pixel together with a luminance value to be read after the color difference value of interest, and restoring a pixel on the basis of the luminance value of interest and the color difference value of interest;
a step of restoring a pixel on the basis of the read luminance value of interest and the color difference value set as the setting value before the luminance value of interest is read if the attribute region to which the pixel corresponding to the read luminance value of interest belongs is the same as that to which the pixel corresponding to the luminance value read immediately before the luminance value of interest belongs; and a step of generating display data by converting a color space of the restored pixel.

9. A non-transitory computer-readable storage medium for storing a computer program for causing a computer to execute the method according to claim 7.

* * * * *